Patented Nov. 17, 1925.

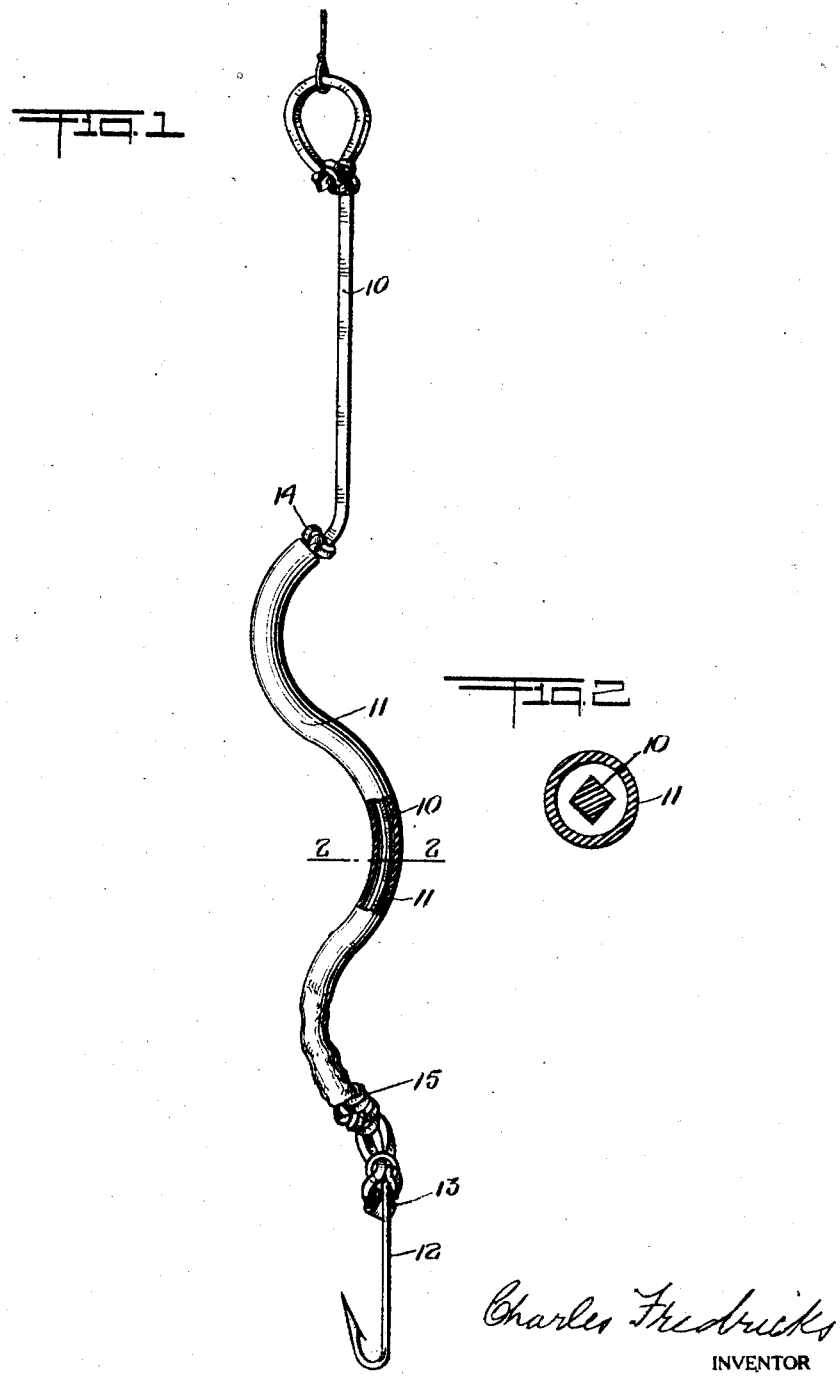

1,561,512

UNITED STATES PATENT OFFICE.

CHARLES FREDRICKS, OF BROOKLYN, NEW YORK.

FISHING TACKLE.

Application filed May 14, 1925. Serial No. 30,160.

*To all whom it may concern:*

Be it known that I, CHARLES FREDRICKS, a citizen of the United States, residing at Brooklyn Borough, in the county of Kings and State of New York, have invented certain new and useful Improvements in Fishing Tackle, of which the following is a specification.

The present invention relates to a novel form of bait or lure for attracting fish to a hook, whereby is produced the illusion of a live wriggling worm on or near the hook.

In producing the aforesaid illusion, I employ a piece of soft tubing, preferably rubber of a reddish color, and carry through a greater or less portion of its length an elastic line or leader. The position of this lure is not material to the invention in its broader aspect, so long as it is so located with respect to the hook or group of hooks as to serve to attract fish from a distance by producing the illusion mentioned. The tube may extend far enough down so that more or less of the hook itself projects into the lower end of said tube, or it may merely surround the leader or line in the vicinity of the hook or group of hooks employed.

One preferred form of my device is illustrated in the accompanying drawing wherein Figure 1 shows the leader, hook and lure in perspective, the lure being partly broken away, and Figure 2 is a view in cross section through the lure and leader on the line 2—2, Figure 1, the same being shown much exaggerated in size.

In the drawing the leader is shown at 10. This may be made of any appropriate material, but I prefer to use an elastic cord preferably rubber, both because of its advantages in its function as a leader, and because it is particularly well adapted to impart a realistic worm-like appearance and movement to the artificial bait or lure.

This bait or lure consists of a section of rubber tubing 11 of small diameter and preferably reddish in color. The leader, as shown, passes entirely or partly through the tube 11, and is attached to the hook 12, preferably by the knot shown. I prefer to use a very short section 13 of rubber tubing on that portion of the leader next the hook, as this section 13 prevents cutting of the elastic leader by the hook in use.

While not essential to this invention as broadly claimed, I prefer to increase the life-like appearance of the bait or lure by giving it a curvilinear or crinkled form as shown.

This form is best produced by simply stretching that part of the elastic line or tension member 10 that passes through the tube 11 and tying a sufficiently large knot 14 in the stretched elastic, so that, on releasing the elastic tension member, its contraction will force the tube to double up in reversed curved or crinkled form as shown in Figure 1; being pressed together between the knots 14 and 15.

The effect of the construction above described is not only to impart the life-like position shown in the drawing, but, owing to the materials used and the normal recurved form of the lure or bait, a life-like movement is imparted to it by the angler pulling the tackle through the water; or this same movement is produced by the pull of a fish upon one of a group of hooks, which attracts other fish to the group.

This life-like movement is produced by extension and contraction of the interior tension member 10, which causes the tube 11 to change its form or curvature, alternately straightening and doubling up, as though alive. Or, if the lure be placed above the sinker, the change in tension produced when the sinker reaches the bottom causes the life-like change in form of the lure. This reaction of the lure to changes in tension is an important feature of the present invention in its preferred form.

In my claims, the word "lure" is intended to cover a means for attracting fish to a hook or group of hooks, whether placed so near the point of a hook as to be properly an artificial bait, or located elsewhere in effective relation to the hook or hooks.

It is also to be understood, as already herein intimated, that in claiming an elastic tension member passing through the flexible tubing, I do not limit myself to a construction wherein the tension member traverses the entire length of such tubing.

What I claim is—

1. Fishing tackle comprising a flexible artificial lure, a hook and an extensible and elastic suspension means for the hook connected with the lure at two separated points on its length, whereby as the suspending means is extended and contracted it imparts changes of form to said lure.

2. An artificial lure for fishing tackle comprising a flexible tubing and an elastic tension member passing through the length of said tubing.

3. An artificial lure for fishing tackle comprising a section of flexible tubing and an interior elastic tension member having knots adapted to draw the tubing into curved form.

4. In a fishing tackle, a hook, an elastic leader tied thereto and a short section of tubing strung on said leader where the hook presses against it, to prevent cutting of the elastic.

In testimony whereof I have hereto affixed my signature on this 12th day of May 1925.

CHARLES FREDRICKS.